US011901121B2

(12) United States Patent
Munoz Sotoca

(10) Patent No.: US 11,901,121 B2
(45) Date of Patent: Feb. 13, 2024

(54) ELECTRONIC SAFETY ACTUATOR AND METHOD OF CONDITION OR STATE DETECTION

(71) Applicant: Otis Elevator Company, Farmington, CT (US)

(72) Inventor: Javier Munoz Sotoca, Madrid (ES)

(73) Assignee: OTIS ELEVATOR COMPANY, Farmington, CT (US)

(*) Notice: Subject to any disclaimer, the term of this patent is extended or adjusted under 35 U.S.C. 154(b) by 255 days.

(21) Appl. No.: 17/532,721

(22) Filed: Nov. 22, 2021

(65) Prior Publication Data

US 2022/0254556 A1 Aug. 11, 2022

(30) Foreign Application Priority Data

Feb. 4, 2021 (EP) .................................... 21382089

(51) Int. Cl.
*H01F 7/16* (2006.01)
*H01F 7/06* (2006.01)
*B66B 5/16* (2006.01)
*H01F 7/08* (2006.01)

(52) U.S. Cl.
CPC ............... *H01F 7/16* (2013.01); *H01F 7/064* (2013.01); *H01F 7/1638* (2013.01); *B66B 5/16* (2013.01); *H01F 7/081* (2013.01); *H01F 2007/086* (2013.01); *H01F 2007/1684* (2013.01)

(58) Field of Classification Search
CPC .......... H01F 7/16; H01F 7/064; H01F 7/1638; H01F 7/081; H01F 2007/086; H01F 2007/1684; B66B 5/16
See application file for complete search history.

(56) References Cited

U.S. PATENT DOCUMENTS

2016/0137455 A1 5/2016 May
2018/0162694 A1 6/2018 Hu
2019/0248628 A1* 8/2019 Dube .................... B60T 13/748
2023/0159302 A1* 5/2023 Munoz Sotoca ......... B66B 5/22
187/376

FOREIGN PATENT DOCUMENTS

WO 2017087978 A1 5/2017

OTHER PUBLICATIONS

European Search Report for application EP 21382089.7, dated Jul. 7, 2021, 71 pages.

* cited by examiner

*Primary Examiner* — Adolf D Berhane

(74) *Attorney, Agent, or Firm* — CANTOR COLBURN LLP

(57) ABSTRACT

An electronic safety actuator (1) for an elevator safety brake, includes a first solenoid (2), a magnet (3), movable by the first solenoid (2) between a first position proximate to the first solenoid (2) and a second position distal from the first solenoid (2) a second solenoid (6) and a detector (8). The detector (8) is arranged to apply an electrical signal to one of the first solenoid (2) and the second solenoid (6), and to detect an electrical signal induced in the other of the first solenoid (2) and the second solenoid (6) as a result of the applied electrical signal. There is also provided a method of detecting a condition or state of the first solenoid (2) or the magnet (3).

15 Claims, 5 Drawing Sheets

ELECTRONIC SAFETY ACTUATOR AND METHOD OF CONDITION OR STATE DETECTION

FOREIGN PRIORITY

This application claims priority to European Patent Application No. 21382089.7, filed Feb. 4, 2021, and all the benefits accruing therefrom under 35 U.S.C. § 119, the contents of which in its entirety are herein incorporated by reference.

TECHNICAL FIELD

This disclosure relates to an electronic safety actuator for an elevator safety brake coil, and a method of detecting a condition or state of a first solenoid or a magnet of the electronic safety actuator.

BACKGROUND

Elevator safety brakes are normally mounted on the frame of an elevator car or counterweight and engage with a rail mounted to a wall of the hoistway so as to provide friction and stop the car or counterweight. Mechanical safety actuators are activated through a mechanical linkage which is triggered through a governor apparatus or the like. An alternative to mechanical safety actuators is to use electronic safety actuators which actuate the brake electrically and therefore do not require the mechanical connection from the governor, through the mechanical linkages. In the case of electronic safety actuators, these are typically actuated (i.e. when braking is required) through electrical means such as a solenoid. For example, when an overspeed and/or over-acceleration event is detected, a controller sends an electrical signal to cause the solenoid to release an actuator component that engages the safety brake. In one possible arrangement the actuator component is a magnet that can be engaged with the guide rail so as to create friction that pulls a connecting lever that in turn pulls a safety wedge or safety roller into contact with the guide rail. Such safety wedges or safety rollers are self-engaging after contact with the rail and provide the braking force that stops the elevator car.

It will be appreciated that the solenoid may be used to actively drive the component (e.g. magnet) towards the guide rail so as to engage the brake (i.e. the solenoid applying a repulsive force), or it may be that the solenoid holds the component (e.g. magnet) in place during normal (non-braking) operation (i.e. the solenoid applying an attractive force) and that upon deactivation of the solenoid, the component then naturally engages with the guide rail (either through its own magnetism or under the force of a separate biasing member such as a spring).

Whichever arrangement is used, it is normally convenient that a power failure causes the release of the component so that power failure will cause the brake to engage for safety reasons.

It can also be beneficial to monitor the state of the actuator, i.e. whether it is engaged (causing engagement of the brake) or disengaged (not causing engagement of the brake). Such monitoring is desirable so as to detect a possible accidental engagement of the actuator or simply to confirm the position of the actuator before and/or after an intentional activation. Such an actuator engagement would of course cause engagement of the corresponding safety brake.

It is known to monitor the health of a solenoid in an electronic safety actuator by triggering and resetting the actuator. This is essentially a test-run of the system, which involves impelling a permanent magnet from the electromagnet to a position in contact with the rail, and then back to the electromagnet. One drawback of this testing process is that this causes the components of the electronic safety actuator to undergo high stresses due to the impacts which occur, causing wear to the system. Detection (or confirmation) of the position of the magnet is achieved by a mechanical switch that is pressed when the magnet is in a retracted state. The triggering and resetting process also causes wear of this mechanical switch.

SUMMARY

According to a first aspect of the present disclosure there is provided an electronic safety actuator for an elevator safety brake, comprising: a first solenoid; a magnet, movable by the first solenoid between a first position proximate to the first solenoid and a second position distal from the first solenoid; a second solenoid; and a detector arranged to apply an electrical signal to one of the first solenoid and the second solenoid, and to detect an electrical signal induced in the other of the first solenoid and the second solenoid as a result of the applied electrical signal.

According to a second aspect of the present disclosure, there is provided a method of detecting a condition or state of a first solenoid or a magnet of an electronic safety actuator for an elevator safety brake, the magnet being movable by the first solenoid between a first position proximate to the first solenoid and a second position distal from the first solenoid, comprising: applying an electrical signal to the first solenoid or a second solenoid; detecting an electrical signal induced in the other of the first solenoid and the second solenoid as a result of the applied electrical signal; and determining the condition or state based on the detected electrical signal.

By providing a second solenoid and a detector, an electrical signal can be applied to one of the solenoids so as to induce an electrical signal in the other solenoid, which can then be detected. The detected electrical signal can provide useful information, for example relating to wear of the first solenoid and/or the position of the magnet relative to the first solenoid. This allows the electronic safety actuator to be tested, e.g. for wear to be measured, without the need to deploy the magnet against the guide rail. This therefore increases the safety and lifetime of the electronic safety actuator since there is decreased wear from the various impacts during such deployment.

The magnet may be a permanent magnet.

In some examples, the detector is further arranged to determine a condition or state of the first solenoid or the magnet by comparing the detected electrical signal to at least one reference value. The reference value may be calculated, pre-determined, or measured e.g. in an initial calibration measurement or series of measurements. The reference value may be an expected or baseline electrical signal, e.g. the signal that would be expected from a new, unworn, undamaged coil. Alternatively, the detected electrical signal may be compared to the applied electrical signal, e.g. to determine a ratio between the two signals. In such cases one of the signals (or an amplified version of one of the signals) may be used as the reference value to which the other signal is compared.

Some examples include determining a position of the magnet, optionally detecting whether the magnet is in the first position or the second position. Some examples include determining that the magnet is in the first position when the detected electrical signal is different to the reference value, i.e. when the detected electrical signal is greater than or less than the reference value. Some examples include determining that the magnet is in the first position when the detected electrical signal is within 50%, 30%, 20% or even 10% of the reference value. Some examples include determining that the magnet is in the second position when the detected electrical signal is 50%, 75%, 80% or even 90% lower than the reference value. Thus, some examples include comparing the detected electrical signal to a (first and/or second) threshold value, wherein the threshold value is calculated based on the reference value. For example a first threshold value (e.g., 50%, 70%, 80% or even 90% of the reference value) may be used, above which the magnet is determined to be in the first position. A second threshold value (e.g. 50%, 35%, 30%, 20% or even 10% of the reference value) may also be used, below which the magnet is determined to be in the second position. In some examples, the detector may be arranged to carry out some or all of these steps.

Some examples may also comprise detecting whether the magnet is in an intermediate position, between the first position and the second position. The magnet will generally be in either the first position, or the second position, due to its magnetism, however it may be in an intermediate position, for example, where an obstruction e.g. a foreign object, is present between the magnet and either the first solenoid or the guide rail, preventing it from moving fully to the first/second position. Where a first and second threshold value are used, it may be determined that the magnet is in an intermediate position where the detected electrical signal is between the first threshold value and the second threshold value. In other examples, a further range may be defined between the first and second threshold values that corresponds to the intermediate position.

For example, a signal applied to one coil may be expected to induce a certain signal in the other coil based on a known or experimentally determined relationship between the two coils. For example, expected values may be determined with the magnet in the first position, the second position, and one or more intermediate positions. The relationship may depend for example on the ratio of the number of turns in the first coil to the number of turns in the second coil and/or on the magnetic permeability or magnetic reluctance of the material inside the coils. Any deviation from the expected signal can then be determined to be due to changes in the relationship. This may be due to wear in the coil, e.g. due to an effective loss of turns in the coil caused by short-circuits between adjacent turns. Alternatively, this can be due to a change in the magnetic circuit passing through the coil such as a change in the reluctance caused by the introduction of (or increase of) an air gap, due to the position of the magnet. Degradation of the coil due to short-circuits is a result of wear, e.g. repeated activations or high temperatures. Changes in magnetic circuit may result from movement of the magnet between the first and second positions.

In some examples, the comparison between the detected electrical signal and the reference value is used to detect wear in the first solenoid. For example, where the detected electrical signal is slightly different than the reference value this may indicate that wear has occurred within the first solenoid. In some examples, a wear value may be calculated indicating the severity of the wear to the first solenoid e.g. based on or proportional to the magnitude of the difference between the detected electrical signal and the threshold. More wear results in more short-circuits between adjacent turns and therefore reduces the turns ratio between the two coils. This in turn changes the relationship between the two coils and correspondingly changes the detected signal. Whether the detected signal is higher or lower as a result of the wear will depend on whether the applied signal is in the coil with more turns or the coil with fewer turns. It will also depend on whether voltage or current is being measured. For example a small voltage applied to the smaller, secondary coil (fewer turns) will result in a large voltage detected in the larger, primary coil (more turns). Wear in the primary coil will result in a smaller than expected voltage detected in the primary coil. On the other hand, a large voltage applied to the larger, primary coil (more turns) will result in a small voltage detected in the smaller, secondary coil (fewer turns). Wear in the primary coil will result in a larger than expected voltage in the secondary coil. Similarly, a large current applied to the smaller, secondary coil (fewer turns) will result in a small current detected in the larger, primary coil (more turns). Wear in the primary coil will result in a larger than expected current in the primary coil.

It will be understood that the second solenoid may be separate from the first solenoid i.e. such that an electrical signal may be applied by the detector to one of the first solenoid and the second solenoid without being applied directly to the other of the solenoids. In other words, the first solenoid comprises a first end and a second end, to which an electrical signal may be applied, and the second solenoid comprises a third end and a fourth end, to which an electrical signal may also be applied. These separate ends allow voltage or current to be applied to the first solenoid or the second solenoid independently. Each end may comprise a respective connector.

The second solenoid may be referred to as a monitoring solenoid. In this document, the terms solenoid and coil are used interchangeably to mean one or more turns (or loops) of electrical conductor, e.g. a helix of multiple turns of electrical conductor.

In some examples, a number of turns of the second solenoid is less than a number of turns of the first solenoid, optionally less than half of the number of turns of the first solenoid, further optionally less than quarter of the number of turns of the first solenoid. In some embodiments, a number of turns of the second solenoid may be less than 100 turns, optionally less than 50 turns, further optionally less than 20 turns, further optionally less than 10 turns and further optionally less than 5 turns. The first solenoid has a large number of turns so as to be capable of providing a strong magnetic field to repel the magnet towards the guide rail (or in the case of a reset to attract the magnet back from the guide rail). The second solenoid is provided for the purposes of monitoring and so does not need to provide a strong magnetic field and therefore has fewer turns. The number of turns in the first solenoid can be selected so as to provide a desired magnetic field strength for the functioning of the safety actuator. The number of turns in the second solenoid can be selected so as to provide a convenient relationship between the signals in the first and second solenoids for ease of measurement.

This difference in number of turns is advantageous since it allows a small electrical signal introduced into one of the solenoids to give rise to a larger electrical signal in the other solenoid, such that only a small electrical signal needs to be applied in order to produce a resulting induced electrical signal which is sufficiently large to be reliably measurable. For example, the ratio of the applied electrical signal to the induced electrical signal may be equal to or proportional to the ratio of the number of turns in the solenoid to which the electrical signal is applied and the number of turns in the solenoid in which the electrical signal is induced. This use of a relatively small electrical signal reduces the cost of applying such an electrical signal e.g. for testing or measurement purposes. Large signals require larger electronic components which are more expensive. Therefore, dealing with smaller signals is typically desirable.

In some examples the detector is arranged to detect a voltage across the first solenoid or the second solenoid. For example, the detector may be arranged to apply the electrical signal to the second solenoid and measure the voltage induced in the first solenoid as a result. Where the second solenoid has fewer turns than the first solenoid, the voltage induced in the first solenoid will be larger than the voltage that is applied to the second solenoid, therefore advantageously requiring only a relatively small voltage to produce a large voltage in the measured solenoid. The small applied voltage is easy to generate with inexpensive electronics. The large detected voltage provides a high degree of sensitivity with which to measure the health or state of the first solenoid and/or magnet.

In some examples the detector is arranged to detect a current across the first solenoid or the second solenoid. For example, the detector may be arranged to apply the electrical signal to the first solenoid and measure the current induced in the second solenoid as a result. Where the second solenoid has fewer turns than the first solenoid, the current induced in the second solenoid will be larger than the current that is applied to the first solenoid, therefore advantageously requiring only a relatively small applied current to produce a large detected current in the measured solenoid. The advantages of inexpensive drive circuitry and high detector sensitivity apply here too.

In some examples the first solenoid and the second solenoid are coaxial. This may allow both solenoids to be conveniently wound onto the same spool or core. This is convenient from a manufacturing and/or assembly point of view as only a single spool or core is required. Additionally, the second solenoid may be easily added to the manufacturing process or even retrofitted to existing actuators without difficulty. The first solenoid and the second solenoid may be made of the same material. The first solenoid and/or the second solenoid may be made of copper. The copper may be coated with a non-conductive coating such as a resin so as to insulate one turn from adjacent turns. As noted above, such coatings can fail over time e.g. due to high working temperatures, leading to short circuits and an effective reduction in the number of turns in the solenoid.

In some examples the electrical signal is applied in the same direction as a braking signal that would cause the electronic safety actuator to move the magnet from the first position to the second position. The magnitude of the electrical signal used for measurement is preferably not large enough to move the magnet from the first position to the second position. An advantage of this arrangement is that the electrical signal applied to or induced in the first solenoid should not cause actuation of the safety actuator (and therefore should not cause engagement of the brake). In other words, if the magnet is in the first position when the electrical signal is applied i.e. the measurement is made then it should remain in the first position after the measurement or detection has been completed.

As discussed above, the first solenoid may be arranged to apply a current to repel the magnet from the first position to the second position, or the first solenoid may be continually supplied with current to hold the magnet in the first position, releasing it to the second position upon a drop in current. In the former case, the default is for no current to flow through the first solenoid, but the detector supplies an electrical signal which either directly applies, or induces, a current through the first solenoid. The applied or induced current may be small enough that the magnetic field so created is not strong enough to move the magnet away from the first position. Similarly, in the latter case, the default is for a current to pass through the first solenoid strong enough to hold the magnet in the first position through magnetic attraction. The applied electrical signal may either directly apply, or induce, a current in the first solenoid which would cause a drop in the current in the first solenoid large enough to be measured but of a magnitude small enough that the first solenoid still provides a strong enough magnetic field to hold the magnet in the first position. Of course, in this latter case, an additional signal on top of the normal signal may be used too.

The detector may be part of a safety actuator board e.g. an electronic board configured to control the first solenoid to move the magnet from the first position to the second position. This allows the detector to be conveniently included as part of an existing component of an elevator system. Alternatively, the detector may be separate from the safety actuator board.

It will be appreciated that all of the preferred and optional features that have been discussed above in relation to one of the first aspect of the disclosure or the second aspect of the disclosure are also applicable to the other aspect and are therefore also correspondingly preferred and optional features of the other aspect.

DRAWING DESCRIPTION

Certain preferred examples of this disclosure will now be described, by way of example only, with reference to the accompanying drawings, in which:

FIG. 1 schematically shows a safety actuator with its magnet in a first "reset" position, proximate to the first solenoid;

FIG. 2 schematically shows a safety actuator with its magnet in a second "trigger" position, distal from the first solenoid;

DETAILED DESCRIPTION

Figure 1:
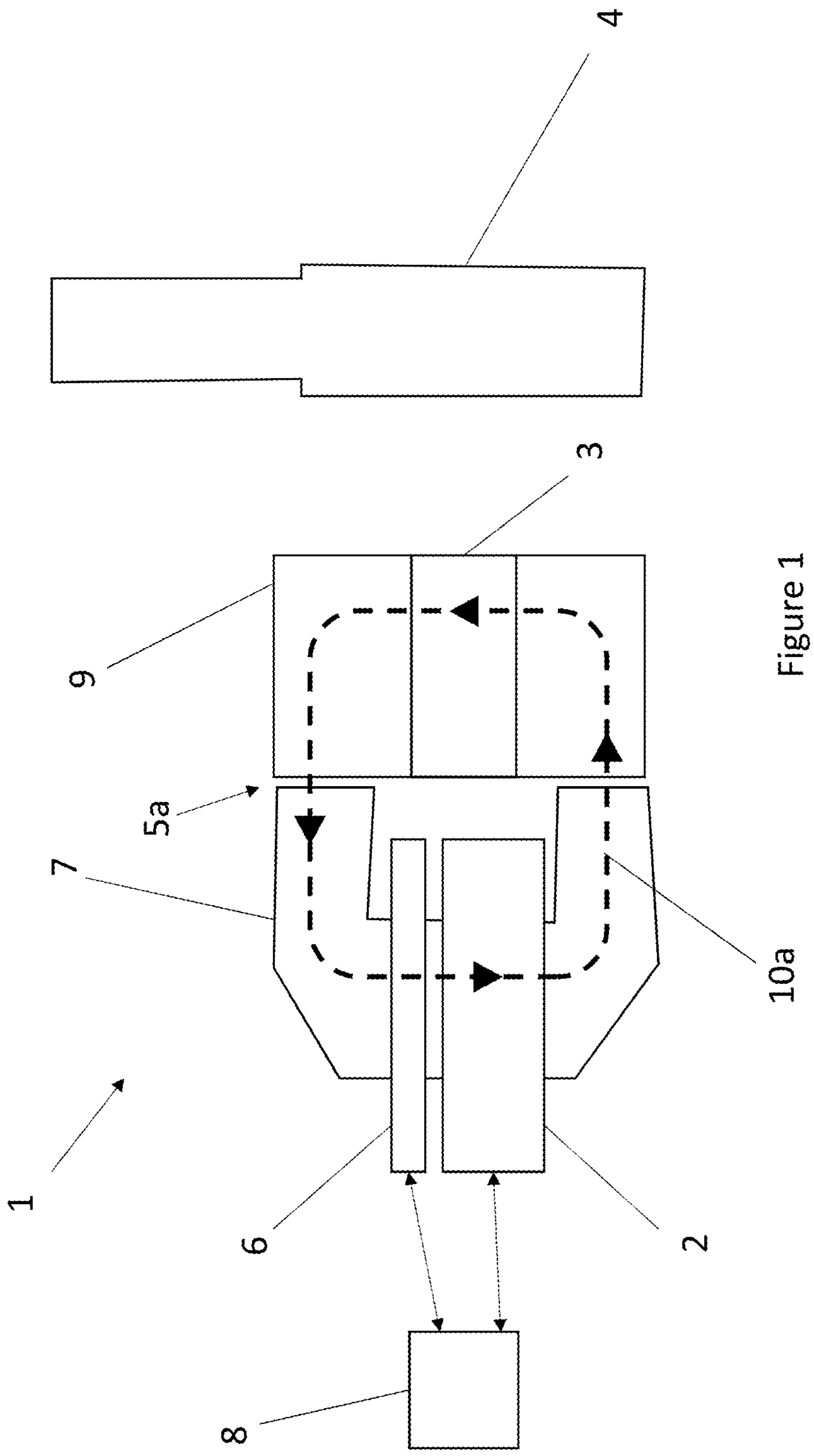

FIG. 1 shows an electronic safety actuator 1 for an elevator car. The safety actuator 1 has a first solenoid 2 wound around a first core 7 e.g. a steel core, to form an electromagnet to which a magnet 3 e.g. a permanent magnet is selectively attached. The magnet 3 is contained by a second core 9 or block e.g. a second steel core. In this figure, the magnet 3 is in a first position, proximate to the first solenoid 2 i.e. the air gap 5*a* between the first core 7 and the second core 9 is small or non-existent.

In this example the magnet 3 is magnetically attached to the first core 7 by virtue of its own magnetic field. The first solenoid 2 is not supplied with any electrical current during normal use. Alternatively, the first solenoid 2 could be powered during normal use and the safety activated when the power supply to the first solenoid 2 is removed, as described above. In the configuration of FIG. 1 the magnet 3 is distanced from the guiderail 4 and is not in contact therewith. A mechanical lever (not shown) attached to the magnet 3 connects to an elevator safety brake (not shown) and when driven parallel to the guide rail 4 causes the safety brake to engage with the guide rail 4 (e.g. via a wedge or roller brake mechanism) so as to bring the elevator car to a stop. In some examples the magnet 3 could be the actual safety brake.

The electronic safety actuator 1 of FIG. 1 also includes a second solenoid 6, and a detector 8, which creates a magnetic circuit 10*a*, as described below.

Figure 2:
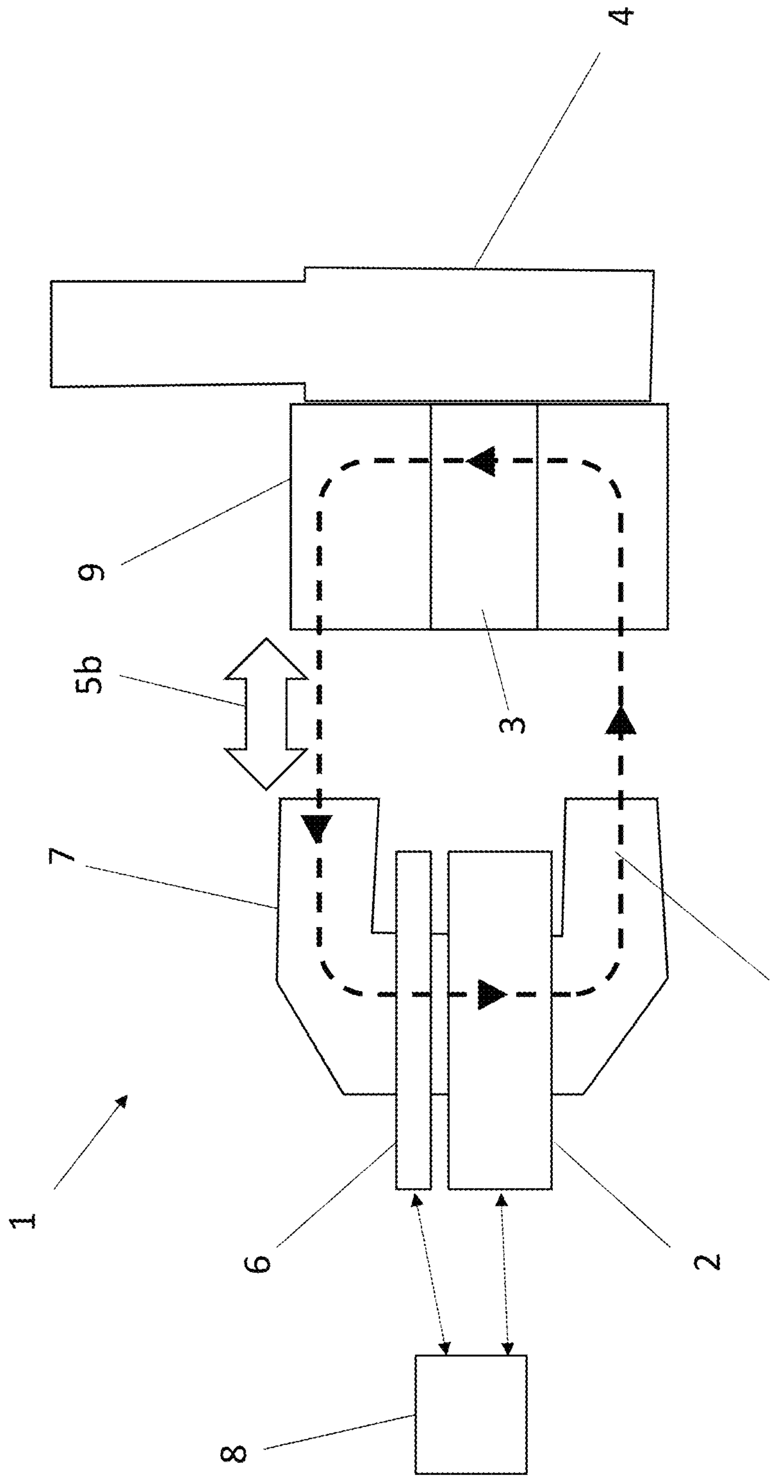

FIG. 2 shows the same equipment as in FIG. 1, but with the magnet 3 in a second position, distal from the first solenoid 2, such that the first core 7 and the second core 9 are separated by a relatively large air gap 5*b*. In this position the magnet 3 is magnetically attached to the guide rail 4. In this position, friction between the guide rail 4 and the magnet 3 causes the lever (not shown) to be driven parallel to the guide rail 4 so as to engage the safety brake and stop the elevator car. The electronic safety actuator 1 of FIG. 2 also includes a second solenoid 6, and a detector 8, which creates a magnetic circuit 10*b*, as described below.

The magnet 3 is moved from the first position of FIG. 1, also referred to as the "reset" position, into the second position (the "trigger" position) of FIG. 2 by a current being applied to the first solenoid 2 so as to create a magnetic field strong enough to repel the magnet 3 away from the solenoid 2 and into magnetic engagement with the guide rail 4. In other examples the current may be removed from the solenoid to remove or reduce an attractive force holding the magnet 3 in place. The magnet 3 may move into an intermediate position (not shown) between the first position and the second position, in the event that its movement between the first and second positions is obstructed in some way, for example by the presence of a foreign object in the path of movement.

In use, an elevator car would typically have two safety brakes and two electronic actuators, each electronic actuator being as shown in FIGS. 1 and 2. In other examples there may be only one safety brake, or more than two safety brakes (and corresponding numbers of electronic actuators). A control unit (not shown) is capable of actuating both safety brakes. When an event (e.g. an overspeed event or overacceleration event) occurs that requires engagement of the safety brakes, a control unit operates switches of a safety actuation board 38 (seen in FIG. 3) that cause the first solenoid 2 to trip, or trigger, the magnet 3 into the rail-engaged ("trigger") position of FIG. 2, thereby lifting the lever (not shown) that connects to the wedges or rollers of the corresponding safety brake.

Figure 3:
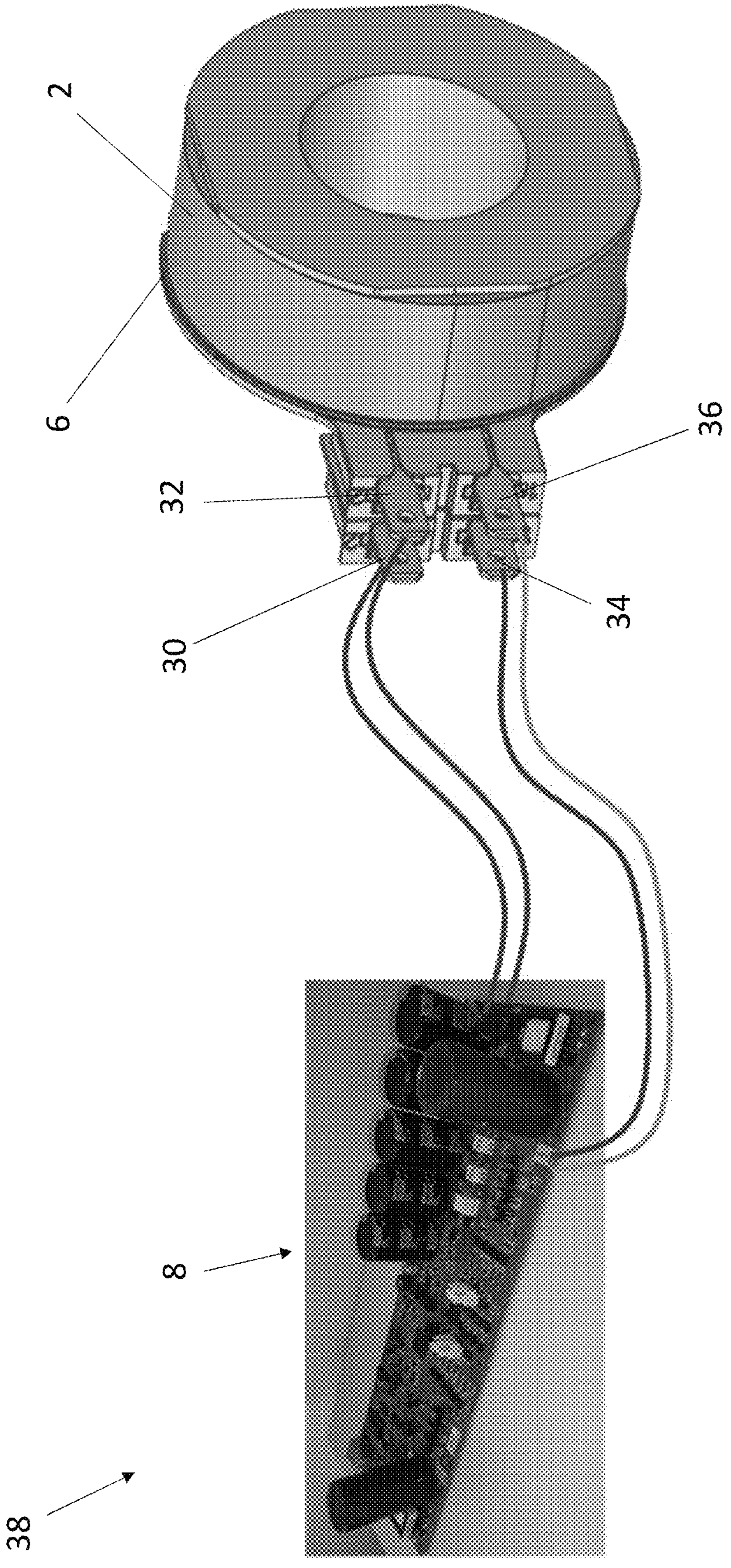
FIG. 3 is a perspective view showing a first solenoid and a second solenoid according to an example of the present disclosure, connected to a safety actuator board.

The electronic safety actuator 1 according to the present disclosure also includes a second solenoid 6, also referred to as a control coil or a monitoring coil, as seen in FIGS. 1, 2 and 3. In the example of the Figures, this second solenoid 6 has a small number of turns, for example one single turn or a few turns. The first solenoid 2 and second solenoid 6 are shown in FIG. 3. As is seen in FIG. 3, the second solenoid 6 just has a few turns, far fewer than the first solenoid 2, and is arranged coaxially with the first solenoid 2 and wound around the same spool (and around the same first core 7).

As seen in FIG. 3, the first solenoid 2 has a first end 30 and a second end 32, which form connectors for each end of the first solenoid 2 through which a current can be driven. The second solenoid 6 also has a first end 34 and a second end 36, which form connectors for each end of the second solenoid 6 through which a current can be driven. Each of the ends are connected separately to the safety actuator board (SAB) 38.

Figure 4:
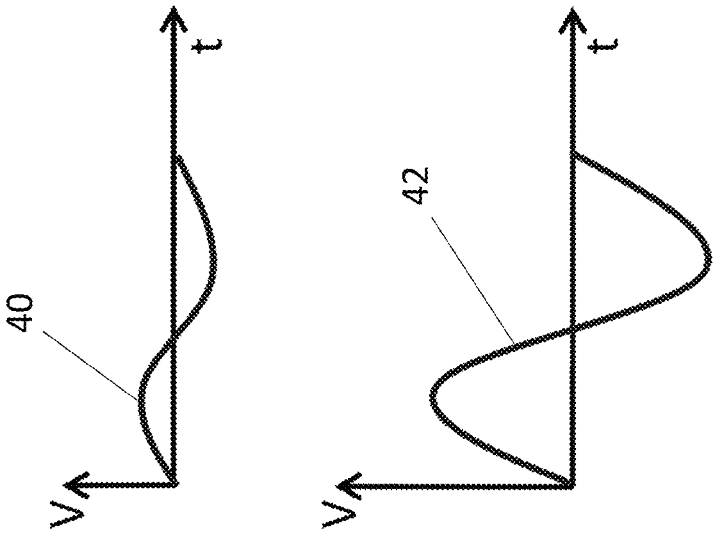
FIG. 4 shows two graphs representing respectively an example of an electrical signal applied to the second solenoid and the corresponding voltage detected in the first solenoid according to an example of the present disclosure.

According to the present disclosure, there is also provided a detector 8, seen in FIGS. 1, 2 and 3. An electric signal (for example as seen in FIG. 4) is introduced into either the first solenoid 2 or the second solenoid 6, through their respective connectors 30, 32, or 34, 36 by the detector 8. This creates a magnetic circuit 10*a*, 10*b* in the electronic safety actuator 1, as seen respectively in FIGS. 1 and 2, which in turn induces a current in the other of the two coils 2, 6, which can then be detected e.g. as a current or voltage.

The magnetic circuit 10*a*, 10*b* is a closed loop path containing a magnetic flux. The flux is generated by either the first solenoid 2 or second solenoid 6 (whichever the electrical signal is applied to). The flux is confined to the path by the cores 7 and 9 and the magnet 3.

In the case of FIG. 1, there is a minimal air gap 5*a* between the cores 7, 9, such that the closed loop path of the magnetic flux 10*a* effectively does not contain an air gap. As a result the magnetic circuit 10*a* has a low reluctance and the induced current approximates the behaviour of a transformer, in which the ratio of the voltages in the two coils is proportional to the number of coils in each solenoid, as represented by the below relationship.

$$\frac{V_1}{V_2} = \frac{N_1}{N_2}$$

This known relationship can be used to determine a reference value e.g. to predict theoretically an expected value for a voltage induced in the first or second solenoid 2, 6, based on an electrical signal applied to the other solenoid, when the magnet 3 is in the first position, shown in FIG. 1. Alternatively, or additionally, test measurements can be made to determine the reference value. The reference value may also be obtained from the applied signal, either directly or via an amplifier or voltage or current divider so as to scale it appropriately for comparison.

The detector 8 detects an induced electrical signal on one of the solenoids 2, 6, based on the electrical signal applied to the other solenoid 2, 6. This detected induced signal can then be compared to the reference value to determine a state or condition of parts of the elevator safety actuator as described below.

In FIG. 2, the magnet 3 is in the second position, i.e. the trigger position. In this position there is a large air gap 5*b* between the cores 7, 9. As a result the closed loop path of the magnetic flux includes the air gap 5*b*. This significantly increases the reluctance of the magnetic circuit 10*b* and accordingly reduces the electrical signal induced in one solenoid 2, 6 by an electrical signal applied to the other. In this case the detected induced signal can also be compared to the reference value. The significant drop in signal compared to the reference value (or expected value), can be used to determine that the magnet 3 is in the second, trigger position of FIG. 2, as described further below. Similarly where the magnet is in an intermediate position a substantial air gap (smaller than the air gap present when the magnet 3 is in the second position) will be included in the closed loop of the magnetic circuit. This will alter the relationship governing an induced electrical signal in one of the coils, resulting in a change in the detected induced signal compared to the value when the magnet is in the first position. In some examples reference values may be acquired with the magnet at a series of intermediate positions (and optionally also in the first position and/or the second position).

FIG. 4 shows an example electrical signal 40, in the upper graph, applied by the detector 8 to the second solenoid 6. Since the ratio of number of turns in the first solenoid 2 to the number of turns in the second solenoid 6 is high, the signal e.g. voltage induced in the first solenoid 2 as a result of the electrical signal applied to the second solenoid 6 will be high, as represented in the lower graph, which shows the induced electrical signal 42. This allows a small voltage to be applied to the second solenoid 6 whilst still inducing a voltage in the first solenoid 2 which is sufficiently large to be measured reliably and with high sensitivity. For example, if the first solenoid 2 has 800 turns and the second solenoid 6 (the monitoring coil) has 10 turns, then the turns ratio is 80:1 and a voltage of 10 mV applied to the second solenoid 6 will induce a voltage of approximately 0.8 V in the first solenoid 2.

This relationship is inverse for current i.e. a small current applied to the first solenoid 2 induces a larger current in the second solenoid 6, so that in examples where the electrical signal to be measured is current, and it is measured in the second solenoid 6, only a small current need be applied to the first solenoid 2. This improves the life of the first and second solenoids 2, 6 since they endure lower voltages and currents.

It will be appreciated that in other examples it is also viable to use a large voltage applied to the first solenoid 2 to produce a small voltage to be detected in the second solenoid 6, or to apply a large current to the second solenoid 6 in order to produce a small current to be detected in the first solenoid 2. Although these arrangements are less desirable from a sensitivity perspective, there may be other operational reasons for using such arrangements.

The relationship laid out above allows an expected value for an induced electrical signal (current or voltage) to be calculated e.g. for the position of the magnet 3 shown in FIG. 1.

The induced electrical signal may differ from the expected value. For example, as described above, when the magnet 3 is in the second, trigger position of FIG. 2, the closed loop 10*b* of the magnetic flux includes the air gap 5*b*. This causes the induced electrical signal to be much lower than the expected reference value based on the ideal ratio relationship described above. When the magnet 3 is in the second position, as shown in FIG. 2, the value of an induced electrical signal e.g. current or voltage, may, for example, be 80% or more lower than the expected value. Where the induced value is so much lower than the expected or predicted value this allows the determination that the magnet 3 must be in the second position. Such a large loss of signal cannot reasonably be attributed to wear in the first solenoid 2 (which would typically be expected to result in a loss of only a few percent of signal) and therefore such determination can be separately made alongside the wear monitoring using the same detector.

Similarly, where the magnet 3 is in an intermediate position, the closed loop will still include an air gap (albeit smaller than the air gap 5*b*). The amount by which the induced electrical signal is lower than the expected reference value will depend on the size of this air gap (i.e. on the distance of the magnet 3 from the first solenoid 2), such that the induced electrical signal can be used to determine whether the magnet is in an intermediate position. The dependency may be a simple linear dependency or may be more complex. It may be determined by measuring a series of test values at different intermediate positions.

As noted, the induced electrical signal may also be lower than the expected induced electrical signal as a result of wear occurring in the first solenoid 2. For example, if the first solenoid 2 is heated above a certain temperature, a coating on the conductor that forms the coil e.g. a resin coating on copper wire, will begin to soften or melt. This may cause contact between adjacent coils of the first solenoid 2, effectively reducing the number of turns in the solenoid 2. This will lead to the induced electrical signal being lower than expected based on the ratio relationship, but not by such a large amount as where the magnet 3 is in the second position. For example, the induced electrical signal may be within 40%, 20% or even 10% of the expected value. In many cases, the loss of only a small number of turns will result in less than 5% deviation from the expected signal.

Thus, comparison of the induced electrical signal, detected by the detector 8, to a predicted or expected value can be used to determine the position of the magnet 3 and also to detect wear in the first solenoid 2.

As noted above, in alternative arrangements, depending on the turns ratio and the choice of first/second solenoid as detector and the choice of voltage/current as measurement characteristic, the signals may be greater than the expected or predicted value instead of lower than it.

Figure 5:
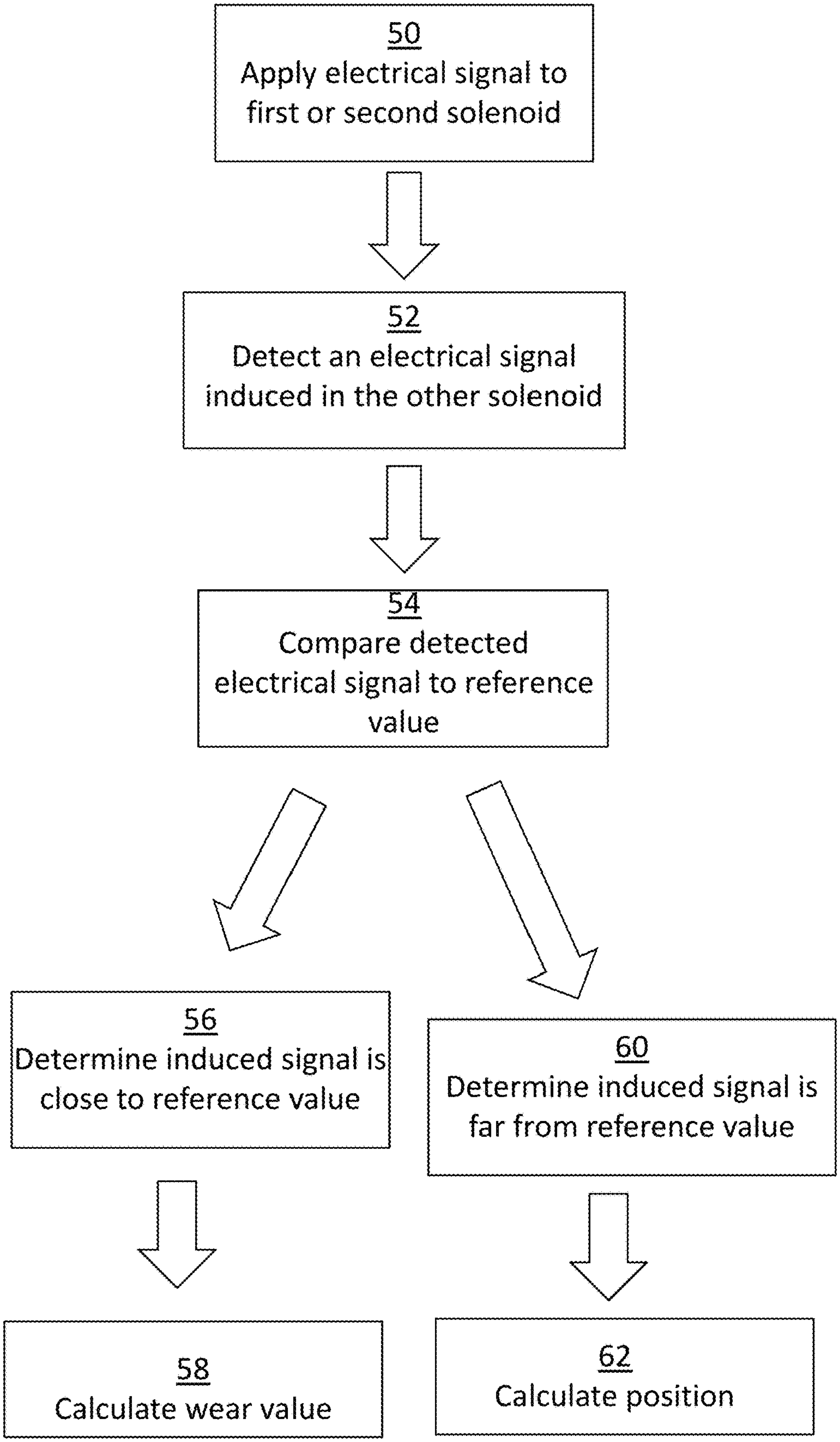
FIG. 5 is a flow chart representing a method according to an aspect of the present disclosure.

Thus, there is also disclosed a method of detecting a condition or state of a first solenoid 2 or a magnet 3 of an electronic safety actuator 1 for an elevator safety brake, as shown in the flow diagram of FIG. 5.

In a first step 50, the detector 8 is used to apply an electrical signal 40 to the first solenoid 2 or a second solenoid 6. Next, in step 52 the detector 8 detects the electrical signal 42 which is induced in the other of the first solenoid 2 and the second solenoid 6 as a result of the electrical signal applied in step 50. Then, in step 54, the detected electrical signal is compared to a reference value.

The reference value may be calculated or predicted using the known relationship described above, or it may be determined or measured in tests, for example by measuring the induced voltage in a test run immediately after installation, where the position of the magnet 3 is known.

Where the value of the induced electrical signal is close to or even equal to the reference value it is determined, in step 56, that the magnet 3 is in the first position, as shown in FIG. 1. This may be the case, for example, when the detected electrical signal is within 20% of the reference value (or more generally within a given range of the reference value). In this case a wear value may then be calculated e.g. by subtracting the detected induced signal from the reference value, in a step 58. This wear value may represent a severity of wear within the first solenoid 2.

Alternatively, it may be determined, in step 60, that the induced electrical signal is far from the reference value e.g. when the detected electrical system is 50% or 80% or more lower than the reference value. In this case a difference this large must be a result of an air gap e.g. the air gap 5*b* shown in FIG. 2, and therefore a determination will be made that the magnet 3 is in an intermediate position, or in the second position i.e. that the magnet 3 is not in the first position.

Then, at step 62 the comparison between the induced electrical signal and the reference value may be used to determine a particular position of the permanent magnet 3, for example that the magnet 3 is in the second position, or in an intermediate position between the first position and the second position. If the magnet 3 is determined to be in an intermediate position, step 62 may also comprise determining an approximate distance of the magnet 3 from the first position i.e. which particular intermediate position the magnet 3 is at. This may, for example, be done by comparing the detected electrical signal to measured or predicted values for a series of intermediate positions, and determining the magnet 3 to be at the intermediate position giving a value closest to the detected electrical signal.

What is claimed is:

1. An electronic safety actuator (1) for an elevator safety brake, comprising:

a first solenoid (2);

a magnet (3), movable by the first solenoid (2) between a first position proximate to the first solenoid (2) and a second position distal from the first solenoid (2);

a second solenoid (6); and a detector (8) arranged to apply an electrical signal to one of the first solenoid (2) and the second solenoid (6), and to detect an electrical signal induced in the other of the first solenoid (2) and the second solenoid (6) as a result of the applied electrical signal.

2. The electronic safety actuator (1) of claim 1, wherein the detector (8) is further arranged to determine a condition or state of the first solenoid (2) or the magnet (3) by comparing the detected electrical signal to at least one reference value.

3. The electronic safety actuator (1) of claim 1, wherein the induced electrical signal is insufficient to move the magnet between the first position and the second position.

4. The electronic safety actuator (1) of claim 1, wherein the detector is arranged to detect a voltage across the first solenoid or the second solenoid.

5. The electronic safety actuator (1) of claim 4, wherein the detector is arranged to apply the electrical signal to the second solenoid (6) and measure the voltage induced in the first solenoid (2).

6. The electronic safety actuator (1) of claim 1, wherein a number of turns of the second solenoid (6) is less than half of a number of turns of the first solenoid (2).

7. The electronic safety actuator (1) of claim 1, wherein a number of turns of the second solenoid (6) is less than 20 turns.

8. The electronic safety actuator (1) of claim 1, wherein the detector is arranged to detect a current in the first solenoid or the second solenoid.

9. The electronic safety actuator (1) of claim 8, wherein the detector (8) is arranged to apply the electrical signal to the first solenoid (2) and measure the current induced in the second solenoid (6).

10. The electronic safety actuator (1) of claim 1, wherein the first solenoid (2) and the second solenoid (6) are coaxial.

11. A method of detecting a condition or state of a first solenoid (2) or a magnet (3) of an electronic safety actuator (1) for an elevator safety brake, the magnet (3) being movable by the first solenoid (2) between a first position proximate to the first solenoid (2) and a second position distal from the first solenoid (2), comprising:

applying an electrical signal to the first solenoid (2) or a second solenoid (6);

detecting an electrical signal induced in the other of the first solenoid (2) and the second solenoid (6) as a result of the applied electrical signal; and determining the condition or state based on the detected electrical signal.

12. The method of claim 11, comprising determining a position of the magnet (3).

13. The method of claim 11, comprising detecting whether the magnet is in an intermediate position, between the first position and the second position.

14. The method of claim 11, comprising determining that the magnet (3) is in the first position when the detected electrical signal is different to a first reference value; optionally wherein the first reference value is at least 80% of an electrical signal expected from an undamaged coil.

15. The method of claim 11, wherein determining the condition or state based on the detected electrical signal comprises detecting wear in the first solenoid (2).

* * * * *